United States Patent [19]

Chase et al.

[11] 4,317,265
[45] Mar. 2, 1982

[54] ELECTRICALLY CONDUCTIVE ELASTOMERS

[75] Inventors: Thomas G. Chase, Union Grove; Steven Poniatowski, Madison, both of Wis.

[73] Assignee: American Roller Company, Chicago, Ill.

[21] Appl. No.: 117,274

[22] Filed: Jan. 31, 1980

Related U.S. Application Data

[63] Continuation-in-part of Ser. No. 943,019, Sep. 18, 1978, abandoned.

[51] Int. Cl.$^3$ .................... B21B 31/08; H01B 1/00
[52] U.S. Cl. ............................. 29/132; 252/500; 252/511; 252/518; 525/194; 525/330; 525/332; 525/351; 525/352; 525/380; 525/382; 525/381; 525/185; 525/539
[58] Field of Search ............... 252/500, 511, 518; 526/39, 525; 29/132

[56] References Cited

U.S. PATENT DOCUMENTS

| | | | |
|---|---|---|---|
| 2,395,493 | 2/1946 | Miller | 526/17 |
| 2,911,392 | 11/1959 | Brooks et al. | 526/39 |
| 2,933,481 | 4/1960 | Rugg | 260/87.7 |
| 2,981,721 | 4/1961 | Brown | 260/80.7 |
| 3,004,007 | 10/1961 | Clayton et al. | 526/39 X |
| 3,071,565 | 1/1963 | Davis, Jr. et al. | 260/77.5 |
| 3,171,830 | 3/1965 | Kehr | 260/88.2 |
| 3,230,273 | 1/1966 | van der Neut et al. | 260/771 |
| 3,293,112 | 12/1966 | Kehr | 161/219 |
| 3,459,694 | 8/1969 | Bowman | 526/39 X |

*Primary Examiner*—Benjamin R. Padgett
*Assistant Examiner*—J. L. Barr
*Attorney, Agent, or Firm*—Quarles & Brady

[57] ABSTRACT

Electrically conductive elastomers are prepared by adding polyfunctional tertiary amine compounds to halogenated polymers. The resulting elastomers have resistivities in the range that makes them suitable as conductors for many electrical and electrostatic applications. These ranges are generally in the area of $1 \times 10^3$ to $1 \times 10^7$ ohm cm as measured by the methods of ASTM 257. A preferred elastomer is prepared by adding a polyfunctional tertiary amine such as N,N,N',N' tetramethyl-1,3-butanediamine to polychloroprene prior to vulcanizing under conventional vulcanization conditions. The resulting elastomers possess useful electrical conductivity, as well as the desirable physical and chemical properties of conventional elastomers. A roller for current-assisted printing or electrostatic-assisted printing having an external surface layer comprised of the novel electrically conductive elastomer is described.

9 Claims, 2 Drawing Figures

ELECTRICALLY CONDUCTIVE ELASTOMERS

The present application is a continuation-in-part of our earlier co-pending application Ser. No. 943,019 filed Sept. 18, 1978 and titled "Electrically Conductive Elastomers", now abandoned.

The present invention relates to electrically conductive elastomers. More particularly, it relates to electrically conductive elastomers having resistivities of about $1 \times 10^3$ to about $1 \times 10^7$ ohm cm which makes them suitable for use as conductors for many electrical and electrostatic applications. It also relates to rollers having an external surface layer of a novel electrically conductive elastomer prepared by the inventive method.

BACKGROUND OF THE INVENTION

Halogenated polymers, including the polychloroprene polymers such as neoprene, have been commercially available for many years and have been used extensively in the roller industry and the rubber industry in general. Elastomers prepared from these polymers possess a combination of properties which make them useful for many rubber applications. Among their desirable properties are resistance to oil, solvents and chemical reagents, good aging characteristics and excellent cured physical properties.

In the past, efforts have been made to improve the electrical conductivity of polychloroprene and other elastomers by incorporating into the elastomers highly structured carbon blacks, conductive plasticizers and/or other electrically conductive additives. However, the use of such conductive additives has not been without disadvantages. For example, the use of structured carbon black at the levels required for desired conductivities restricts the ability to obtain other desired properties and makes it impossible to prepare non-black electrically conductive articles. The use of carbon black and/or other powdered additives makes it difficult to obtain materials having a high degree of uniformity in conductivity. The use of conductive plasticizers has generally resulted in a degradation of physical properties and lack of permanence of conductivity.

Recently, urethane elastomers having electroconductive properties have been prepared by incorporating quaternary ammonium salts into the elastomer formula. However, the quaternary ammonium salts that have been found to be useful are relatively expensive and the resistivities of the elastomers obtained are generally unacceptably high. Furthermore, some of the quaternary ammonium salts are potentially hazardous to workers and their use requires the use of a solvent system so that the elastomers can only be made in the form of films or sheets.

The need still exists for electrically conductive elastomers having the good physical properties of halogenated polymers, such as neoprene.

SUMMARY OF THE INVENTION

It is the general object of the present invention to disclose electrically conductive elastomers prepared from halogenated polymers, such as neoprene.

It is a further object to disclose electrically conductive elastomers prepared from halogenated polymers, such as neoprene, which do not require conductive additives, such as highly structured carbon, conductive plasticizers, antistatic agents and the like.

It is still another object to disclose a novel roller having a covering of an elastomer of the present invention which is especially suited for a variety of applications requiring an electrically conductive covering such as a static discharge roller.

The elastomers of the present invention are preferably prepared by adding polyfunctional tertiary amino compounds to halogenated polymers such as neoprene prior to vulcanizing.

The amino compounds preferred for use are those which can be readily and homogeneously mixed with the polymers to obtain elastomers of uniform conductivity thus eliminating the need to employ solvent systems. As a result, the elastomers can be conveniently formed into any desired shapes and are not limited to thin films. Furthermore, the mixtures of the polymers and the amino compounds are generally self-vulcanizing under normal vulcanizing conditions making it possible, if desired, to eliminate the use of other crosslinking or accelerating agents.

The electrically conductive elastomers of the present invention have useful electrical conductivities as low as $1 \times 10^3$ ohm cm even in the absence of carbon black and other conductive additives. In addition, the elastomers are conductive in a manner which makes it possible to predict the conductivity changes with changes in contact areas and distance between contacts. Most prior art systems using conductive fillers make such predictions unreliable. The conductivity of the elastomers containing the amino compounds is high enough for most normal applications. However, if desired, conductive fillers and/or conductive plasticizers such as carbon black and other additives can be incorporated into the elastomer to further increase the conductivity.

Surprisingly, the elastomers of the present invention have the same desirable physical properties, such as hardness and good tensile strength, and chemical properties as do conventionally prepared elastomers which do not contain the amino compounds.

DESCRIPTION OF THE PREFERRED EMBODIMENT

Figure 1:
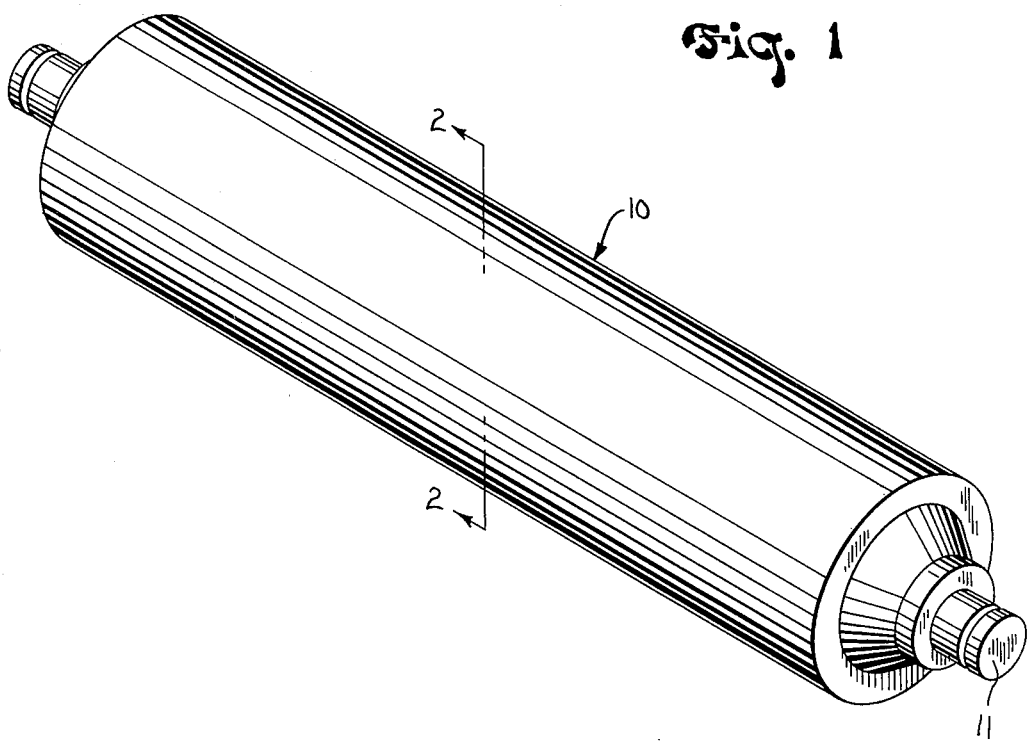
FIG. 1 is a perspective view of a roller having an external surface layer comprised of an elastomer of the present invention.
Figure 2:
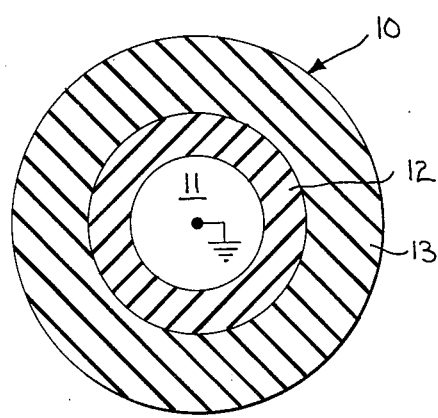
FIG. 2 is a sectional view of the roller of FIG. 1 taken along lines 2—2.

In the preferred practice of the present invention, the electrically conductive elastomers are prepared by adding the polyfunctional amino compound, which is preferably a liquid, to the halogenated polymer prior to vulcanization. The mixtures of the polymers and amino compounds are generally self-vulcanizing under conventional vulcanizing conditions thus making it possible, if desired, to eliminate the conventional metal oxides, crosslinking agents and organic accelerators.

The amino compounds which can be employed to prepare the elastomers of the present invention include polyfunctional aliphatic tertiary amines, substituted thioureas, thiurams and thiocarbamates. These amino compounds may be represented by the formula:

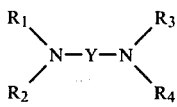

wherein $R_1$, $R_2$, $R_3$, and $R_4$ are aliphatic groups of 1 to 8 carbon atoms, except when the amine is a substituted thiourea, in which case $R_1$ also may be H; Y is selected from (a) an alkylene of the formula:

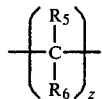

in which z is 1 to 5, $R_5$ and $R_6$ are selected from hydrogen, lower alkyl of 1 to 5 carbon atoms, hydroxyl and amino groups, (b) C=S,

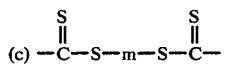

in which m equals a polyvalent metal cation such as copper, zinc and bismuth, and

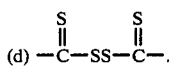

Representative of the amino compounds that can be employed to prepare the elastomers of the present invention are the following:
N,N,N',N' tetramethyl-1,3-butanediamine,
N,N,N',N' Tetramethylethylenediamine,
Tetramethylthiuram monosulfide,
Tetramethylthiuram Disulfide,
Tetraethylthiuram Disulfide,
Tetrabutylthiuram Disulfide,
Bismuth dimethylthiocarbamate,
Cadmium dimethyldithiocarbamate,
Copper dimethyldithiocarbamate,
Zinc dimethyldithiocarbamate,
Zinc dibutyldithiocarbamate, and
Trimethylenethiourea.

The polymers that can be used may be represented by the formula:

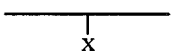

in which x is a reactive halogen, preferably Cl or Br, or a reactive halogen containing group such as the chlorosulfonyl group.

Representative of the polymers which can be employed in preparing the elastomers are the polychloroprenes or neoprenes, including Neoprene GNA, Neoprene W and Neoprene S5, bromobutyl, chlorobutyl, chlorosulfonated polyethylene, chlorinated polyethylene-chloroprene blends and epichlorohydrin-chloroprene blends. Blends containing the above elastomers may also be used.

Although the exact mechanism by which the addition of the tertiary amino containing compounds increase the electrical conductivity of the elastomers is not known, it is believed that the tertiary amino groups cooperate with the polymeric halogens to form quaternary ammonium salts.

The theorized reaction may be illustrated as follows:

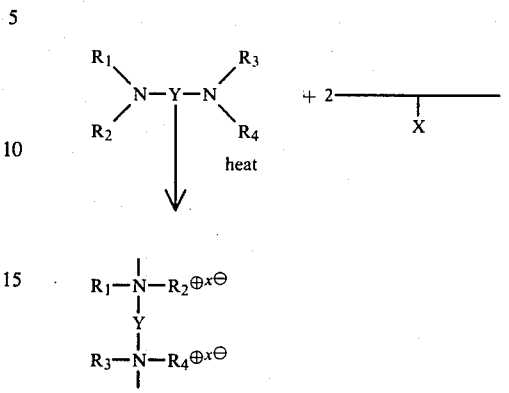

in which all symbols are as previously defined.

The elastomers obtained have been found to have resistivities as low as $1 \times 10^3$ ohm centimeters even without the use of carbon black or other known conductive additives. Controls not containing the amino compounds have unusable resistivities in the range of $1 \times 10^8$ to $1 \times 10^{10}$ ohm centimeters or higher.

Referring now to the drawings, in FIG. 1 a roller 10 of the type employed as an impression roller in current-assisted printing is illustrated. A detailed description of current-assisted or electrostatically assisted printing and the function of the impression roll can be found in the Adamson et al U.S. Pat. No. 3,477,369 and the Hutchinson U.S. Pat. No. 3,625,146 which are incorporated herein by reference.

As seen in the drawings, the impression roller 10 has a metal core 11 surrounded by a non-conducting insulating layer 12, preferably of an elastomer, to the outside of which has been applied a semi-conductive layer 13. The layer 13 which forms the external peripheral surface of the roller 10 is comprised of an electrically conductive elastomer of the present invention, which is preferably resilient having a durometer of about 60 to about 95 by the Shore A scale and has an electrical resistivity of about $1 \times 10^3$ ohm cm to $1 \times 10^7$ ohm cm. The layers 12 and 13 are bonded to the core or to each other to provide a unitary structure. An alternate design has a single layer of electrically conductive elastomer applied directly to the metal core and achieves the necessary electrical insulation through other means.

It will readily be understood that the elastomers of the present invention also can be used in the manufacture of semi-conductive or conductive rollers of other types including rollers of the type disclosed in the Adamson et al Pat. No. 3,477,369 and the Hutchinson Pat. No. 3,625,146.

In the preferred method of manufacture, the conductive elastomeric layer is applied to a roller having the other required layers already applied thereto by coating the external surface of the roller with a suitable thickness of a mixture containing the polymer and the tertiary amino containing compound. The covered roller is then subjected to suitable pressure and heat to vulcanize at about 300° F. for about 12 hours or until the vulcanization is complete. As a result of the vulcanization, the elastomer is securely bonded to the roller.

The degree of conductivity and rate and state of cure depend upon the type and amount of polymer and amine employed. Although generally the addition of any amount of a tertiary amino compound to the polymer will increase the electrically conductive properties of the resulting elastomer, it has been found that the addition of about 1 to about 15 parts of the amino compound per 100 parts of the polymer is adequate to yield elastomers having suitable electroconductive properties for uses as impression rollers even without the use of conventional conductive fillers such as carbon black.

The practice of the present invention is further illustrated by reference to the following examples.

EXAMPLE 1

An electrically conductive neoprene composition was prepared by mixing 100 parts of neoprene GNA, 1 part stearic acid, 5 parts of carbon black (ASTM N330HAF Black), 40 parts precipitated silica and 3 parts of N,N,N',N' tetramethyl 1-3-butanediamine on a two-roll mill until a uniform mixture was obtained. The formulation was then cured under steam vulcanization conditions at 300° F. for 12 hours until the curing was complete. The resulting elastomer was about 75 durometer Shore A in hardness and had a tensile strength in excess of 2500 psi. The electrical resistance of the elastomer layer of the roller was measured by attaching electrodes to the surface of the roller about 2 inches apart and applying electrical potential. The current flow was measured on an ampmeter and the ohms resistance calculated. The elastomer had a resistance electrically of 0.6 Megohms ($6 \times 10^5$ ohms). A similar composition containing a mixture of 5 parts zinc oxide and 4 parts magnesium oxide, but no amine ingredient had similar physical properties but an electrical resistance of 25,000 Megohms ($2.5 \times 10^{10}$).

EXAMPLE 2

The procedure of Example 1 was repeated employing 2 parts of N,N,N',N' tetramethyl ethylenediamine as the sole tertiary amino containing compound. The resulting elastomer had similar physical properties and the resistance electrically of $1.1 \times 10^6$ ohm cm.

EXAMPLE 3

The procedure of Example 1 was repeated employing 5 parts tetramethylthiuram disulfide as the sole tertiary amino containing compound. The resulting elastomer had similar physical properties and a resistance electrically of $1.1 \times 10^6$ ohm cm.

EXAMPLE 4

The procedure of Example 1 was repeated employing 6 parts copper dimethylthiocarbamate as the sole tertiary amino containing compound. The resulting elastomer had similar physical properties and a resistance electrically of $5 \times 10^5$ ohm cm.

EXAMPLE 5

A mixture of 100 parts neoprene GNA (Dupont), 0.5 parts stearic acid, 80 parts carbon black filler (ASTM N762SRF Black) and 5 parts tetramethylthiuram disulfide were mixed on a two-roll mill to form a uniform mixture and vulcanized. The resulting elastomer had an electrical resistivity of $1 \times 10^5$. An elastomer prepared in a conventional manner having the same content of carbon black and no tetramethylthiuram disulfide had an electrical conductivity of $1 \times 10^8$.

EXAMPLE 6

The procedure of Example 5 is repeated using only 50 parts of carbon black filler (ASTM N550 FEF Black). The resulting elastomer had a useful electrical conductivity.

EXAMPLE 7

The procedure of Example 5 was repeated using only 25 parts of carbon black filler (Acetylene black). The resulting elastomer had an electrical resistivity of $4.5 \times 10^4$.

EXAMPLE 8

A mixture of 100 parts Neoprene M1 (Denka), 80 parts hard clay, 10 parts light process oil, 2 parts powdered polyethylene, 3 parts tetramethylthiuram disulfide and 3 parts dimethylthiocarbamate were mixed in a two-roll mixer to form a uniform mixture and then steam vulcanized. The resulting elastomer had an electrical resistivity of $2 \times 10^7$.

EXAMPLE 9

A mixture of 100 parts Neoprene GNA, 40 parts precipitated silica (HiSil 233), 5 parts zinc oxide, 4 parts magnesium oxide and 3 parts of N,N,N',N' tetramethyl-1-3-butanediamine were uniformly mixed in a two-roll mill. The formulation was then cured under steam vulcanization conditions at 300° F. for 12 hours until curing was complete. The resulting elastomer had good hardness and tensile strength and a resistance electrically of $4 \times 10^6$.

EXAMPLE 10

A mixture of 70 parts Neoprene TRT, 30 parts epichlorohydrin rubber, 160 parts of medium thermal black filler (ASTM N990) and 3 parts of a mixture of tetramethylthiuram disulfide and copper dimethylthiocarbamate were mixed in a two-roll mill to form a uniform mixture and vulcanized. The resulting elastomer had an electrical resistivity of $3 \times 10^3$ ohm cm.

Rollers employing the elastomers of the present invention, in addition to possessing increased electroconductivity, possess a combination of advantageous properties not previously found in a single roller. This technology makes possible the formulation of low hysteresis roller coverings which possess uniform conductivity.

Although for purposes of illustration, formulations have been described including specific ingredients and reaction conditions it will be understood that the invention is not so limited.

It is intended that the terms used in the specification and the claims be interpreted as broadly as is consistent with the scope of the invention disclosed herein. For example, although the term "halogenated polymer" has been used to describe neoprenes and other specific polymers, it is to be understood that the term is to be interpreted to cover any polymer that functions in an equivalent manner and cooperates with a tertiary amino containing compound to improve the electroconductivity of the resulting elastomers. The terms "amino containing compound" and "polyfunctional tertiary amino containing compound" are to be likewise broadly construed.

It will be readily understood by those skilled in the art that the electrically conductive elastomers of the present invention can be used for products other than rollers. For example, the elastomers might be used for making conductive products such as flooring, wheels and other equipment for hospital operating rooms. In general, the elastomers may be used in any application in which electrical conductivity, in addition to the normal physical and chemical properties of elastomers prepared from halogenated polymers, is desired.

We claim:

1. The method of preparing an electroconductive elastomer having resistivity of about $1\times10^3$ to about $1\times10^7$ ohm cm which comprises reacting a halogenated polymer selected from the group consisting of polychloroprene, bromobutyl, chlorobutyl, chlorosulfonated polyethylene, chlorinated polyethylene-chloroprene, epichlorohydrin-chloroprene and blends thereof with about 1 to about 15 parts per 100 parts of the polymer of a polyfunctional amine selected from compounds of the formula:

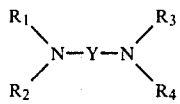

wherein $R_1$, $R_2$, $R_3$ and $R_4$ are aliphatic groups of 1 to 8 carbon atoms and Y is selected from (a) an alkylene of the formula:

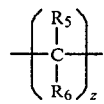

in which z is 1 to 5, $R_5$ and $R_6$ are selected from hydrogen, lower alkyl of 1 to 5 carbons, hydroxy and amino groups, (b) C=S,

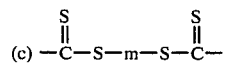

in which m equals a polyvalent metal cation, and

2. The method of claim 1 in which the halogenated polymer is polychloroprene.

3. The method of claim 1 in which the polyfunctional amine is N,N,N',N'-tetramethylethylenediamine.

4. The method of claim 1 in which the tertiary amine is N,N,N',N' tetramethyl-1,3-butanediamine.

5. The method of claim 1 in which the polyfunctional tertiary amine is a mixture of tetramethylthiuram disulfide and dimethyldithiocarbamate.

6. An electroconductive elastomer having a resistivity of about $1\times10^3$ to about $1\times10^7$ ohm cm which is prepared by reacting a halogenated polymer selected from the group consisting of polychloroprene, chlorobutyl, bromobutyl, chlorosulfonated polyethylene, chlorinated polyethylenechloroprene, epichlorohydrinchloroprene and blends thereof with about 1 to about 15 parts per 100 parts of the polymer of a polyfunctional amine selected from compounds of the formula:

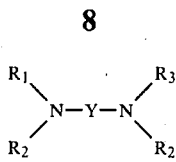

wherein $R_1$, $R_2$, $R_3$ and $R_4$ are aliphatic groups of 1 to 8 carbon atoms and Y is selected from (a) an alkylene of the formula:

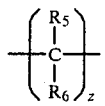

in which z is 1 to 5, $R_5$ and $R_6$ are selected from hydrogen, lower alkyl of 1 to 5 carbons, hydroxy and amino groups, (b) C=S,

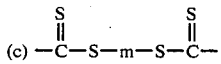

in which m equals a polyvalent metal cation, and

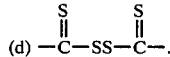

7. An electroconductive elastomer of claim 6 in which the halogenated polymer is polychloroprene.

8. An electroconductive elastomer of claim 6 in which the halogenated polymer is polychloroprene and the amine is N,N,N',N'-tetramethylethylenediamine.

9. In a roller having an electrically conductive resilient layer, the improvement which comprises forming said layer of an elastomer which has been prepared by reacting a halogenated polymer selected from the group consisting of polychloroprene, bromobutyl, chlorobutyl, chlorosulfonated polyethylene, chlorinated polyethylene-chloroprene, epichlorohydrin-chloroprene and blends thereof with about 1 to about 15 parts per 100 parts of polymer of a polyfunctional amine selected from the group consisting of compounds of the formula:

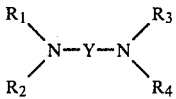

wherein $R_1$, $R_2$, $R_3$ and $R_4$ are aliphatic groups of 1 to 8 carbon atoms, except when the amine is a substituted thiourea, wherein R1 may also be hydrogen, and Y is selected from (a) an alkylene of the formula:

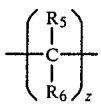

in which z is 1 to 5, $R_5$ and $R_6$ are selected from hydrogen, lower alkyl of 1 to 5 carbons, hydroxy and amino groups, (b) C=S,

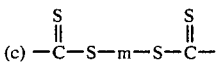

in which m equals a polyvalent metal cation, and

* * * * *